United States Patent [19]

Zafir

[11] Patent Number: 4,717,291

[45] Date of Patent: Jan. 5, 1988

[54] AUTOMATIC COUNTERSINK DEPTH CONTROL TOOL FOR FASTENER INSTALLER

[75] Inventor: Avinoam Zafir, Karmiel, Israel

[73] Assignee: The Boeing Company, Seattle, Wash.

[21] Appl. No.: 915,633

[22] Filed: Oct. 6, 1986

[51] Int. Cl.⁴ .............................................. B23B 49/00
[52] U.S. Cl. ......................................... 408/13; 408/8; 408/99; 408/110
[58] Field of Search .................... 408/14, 15, 241 S, 3, 408/8, 13, 99, 110, 111, 112

[56] References Cited

U.S. PATENT DOCUMENTS

| | | | |
|---|---|---|---|
| 2,529,988 | 11/1950 | Zempel | 10/147 |
| 2,779,218 | 1/1957 | Edgerton | 77/55 |
| 2,823,563 | 2/1958 | Nipken | 77/55 |
| 2,868,044 | 1/1959 | Chaffee et al. | 77/55 |
| 2,967,441 | 1/1961 | Miles | 77/55 |
| 3,110,226 | 11/1963 | Dionne | 90/62 |
| 3,475,998 | 11/1969 | Steiner et al. | 408/8 |
| 3,640,633 | 2/1972 | Gersch et al. | 408/12 |
| 3,740,161 | 6/1973 | Milewski | 408/158 |
| 3,804,544 | 4/1974 | Adams | 408/14 |
| 4,273,481 | 6/1981 | Corley et al. | 408/14 |
| 4,436,460 | 3/1984 | Powell | 408/14 |
| 4,530,625 | 7/1985 | Corley et al. | 408/14 |

Primary Examiner—Gil Weidenfeld
Assistant Examiner—Steven C. Bishop
Attorney, Agent, or Firm—Eugene O. Heberer

[57] ABSTRACT

An automatic countersink depth control tool and a combination of the same with an installer for fasteners having countersink heads. The tool has a nonrotatable stop (76) for limiting the depth of a countersink drilled in a fastener hole. The stop (76) is adjustably movable toward or away from a workpiece in which the countersink is to be drilled, the movement of the stop being relative to the depth of the countersink. There is a rotatable screw gear (50) having an external ring gear (54) for moving the stop in accordance with the depth of the countersink and in accordance with the height of the head of the countersink head of the fastener to be installed in the hole. There is a motor (90) having a spur gear (94) engaged with the ring gear (54) to rotate it a predetermined amount by a threaded engagement of the screw gear (50) and the stop (76). Because the stop is nonrotatable, the rotation of the threads moves the stop the desired amount. There is a pressure foot surface (110) associated with a fastener installer to receive the stop (76) in abutment after it has been adjustably moved in accordance with the height of the countersink head to control the depth of the countersink being drilled. As the stop is being moved toward abutment with the pressure foot (110) the countersink drilling occurs and the drilling is completed and stopped when the abutment occurs. The tool adjusts the countersink depth for each individual fastener, measured previously on a head height checker.

11 Claims, 6 Drawing Figures

AUTOMATIC COUNTERSINK DEPTH CONTROL TOOL FOR FASTENER INSTALLER

DESCRIPTION

1. Technical Field

The invention relates to a device for controlling the cutting depth of a cutting tool or a tool for use on an installer for fasteners having countersink heads. The latter tool controls countersink drilling so that the drilled countersink depth is equal to the fastener countersink height with a tolerance of plus or minus 0.0005 inch.

2. Background Art

The flatness of a typical aircraft wing surface is generally limited to a tolerance of 0.003 inch and thus, fastener heads cannot extend above or below the wing surface more than that amount. When aluminum fasteners have been used, excessive amounts of the heads above the wing surface have been shaved off. This is relatively easy to do because of the softness of aluminum.

There has been an increasing use of titanium fasteners because of their greater strength but because of their hardness it is not possible to shave excessive head heights from wing or other aircraft surfaces, for example.

With the use of titanium fasteners having countersink heads, there has been a serious problem to maintain constant fastener head flushness with aircraft surfaces. The problem has been caused by wide fastener fabrication tolerances, multiple sources for fasteners, and variations among different lots of fasteners.

In the manufacture of many large aircraft, Gemcor brand automatic riveting machines are used to install the fasteners. Attempts have been made to control the drilled countersink depth but they have been unsatisfactory. Some controls were considered for installation above the spindle and transfer head assemblies but these would have been at too great a distance between the controls and the drill so as to create excessive errors in the accuracy of the drilled countersinks. Because of the various arrangements, prior countersink drills stops had to be made in eccentric form which caused off-center bending and resulting errors.

A search of the patent literature has disclosed systems which illustrate drilling stops. For example, U.S. Pat. No. 3,640,633 to Gersch et al. discloses an automatically adjustable boring and turning quill assembly for a boring machine and including an adjustable eccentric sleeve member for moving or turning a boring bar radially toward and away from the workpiece and a piston which upon axial movement produces adjustment of the sleeve member. Fine adjustment to compensate for wear of the boring bar is provided by a stepping motor which actuates an adjustable stop for the piston.

U.S. Pat. No. 3,740,161 to Milewski discloses means and method for adjusting the setting of a cutting tool edge, within close tolerance limits, and automatically, which includes a spindle rod to retract the cutting edge following a work stroke, an abutment stop that the spindle rod bears during a work stroke, and means for setting the spindle stop free from the axial work load normally imposed thereupon.

U.S. Pat. No. 4,273,481 to Corley et al. is for a self-contained hydraulic stop which attaches between a spindle of a numerical control machine and a drill bit, or countersink, and provides an interconnection between the drill bit or countersink and the numerical control machine. When the numerical control machine begins its operation the hydraulic stop provides a rotary motion and hydraulic stiffening between the numerical control machine and the cutting tool. The stop senses the exact location of the part, permits cutting of the workpiece to a predetermined depth and then releases the hydraulic fluid under pressure to provide a discontinuity between the numerical control machine and the cutting tool and thereby limits the penetration of the workpiece by the cutting tool to a predetermined depth.

The following patents disclose systems generally related to those described above:

| U.S. Pat. No. | Inventor |
|---|---|
| 2,529,988 | Zempel |
| 2,779,218 | Edgerton |
| 2,823,563 | Nipken |
| 2,868,044 | Chaffee et al. |
| 2,967,441 | Miles |
| 3,110,226 | Dione |
| 3,804,544 | Adams |
| 4,530,625 | Corley et al. |

3. Disclosure of the Invention

The invention is a depth control device for a cutting tool or an automatic countersink depth control tool for use, and in combination therewith, on an installer for fasteners having countersink heads. The tool is comprised of a nonrotatable stop in the form of a nut for limiting the cut depth or drilled depth of a countersink in a fastener hole. The countersink is drilled with a countersink drill associated with the stop and limited in drilling depth by action of the stop. The stop is adjustably movable by a rotatable member, toward or away, from a workpiece in which the countersink is to be drilled, and the movement of the stop is relative to the depth of the cut or of the countersink, the height of the countersink head to be installed, and with respect to the position of the drill.

There are motor means engaged with the rotatable member, a screw gear or external ring gear, to rotate it a predetermined amount to move the stop in accordance with the height of the countersink. Surface means are associated with the fastener installer to receive the stop in abutment after it has been adjustably moved in accordance with the height of the countersink head to control the depth of the countersink being drilled. The stop is moved into abutment with the surface means by drill support means in the installer and while the stop is being moved into the abutment, the countersink drilling occurs and the drilling is completed and stopped when the abutment occurs. The stop and screw gear are supported by the drill support means which support, raise and lower, and rotate the drill. The stop and screw gear are positioned on the drill support means, surrounding the spindle and adjacent the drill.

The means engaged to rotate the screw gear include a motor and an encoder for receiving a command from a system controller with respect to the height of the countersink head of each fastener. The command to the motor and encoder requires rotation of the screw gear an amount sufficient to move the stop toward or away from the workpiece corresponding to the height of the countersink head and the depth of the countersink to be drilled. The means supporting the drill is powered to move the drill into the drilling position and to move the stop into abutment with the surface means to stop the drilling and to remove the drill from the hole when the drilling is completed. There is a feedback loop from the motor to the system controller to send a command to the controller to verify that the stop is in the commanded position.

When the screw gear is rotated, the nonrotatable nut is driven by a threaded engagement with the screw gear toward or away from the workpiece.

There is a spline connecting the nut to a tool base and to the drill supporting drive means to prevent the nut from rotating. There are pin means extending into the nut and the spline. The pins are surrounded by coil springs to constantly bias the nut away from the surface means to prevent backlash on the nut driving threads.

There are switch means connected to the nut and drill supporting means to limit return of the nut to a home position when the installer is shut off.

In the operation of the present invention each fastener head height variation is measured with respect to a nominal size. This information is fed into the system controller so as to control the drill countersink depth stop.

The advantages of the present invention are that it is usable on existing equipment such as the Gemcor brand automatic riveter; it tailors a countersink hole for each fastener; it avoids clearances stackup through the spindle and transfer head assemblies by being located close to the drill bit; the stop nut is concentric rather than eccentric so as to avoid off-center bending; and there are only minor changes required to install the invention on the existing drill spindle configuration.

Further advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings which are for illustrative purposes.

BEST MODE FOR CARRYING OUT THE INVENTION

Figure 1:
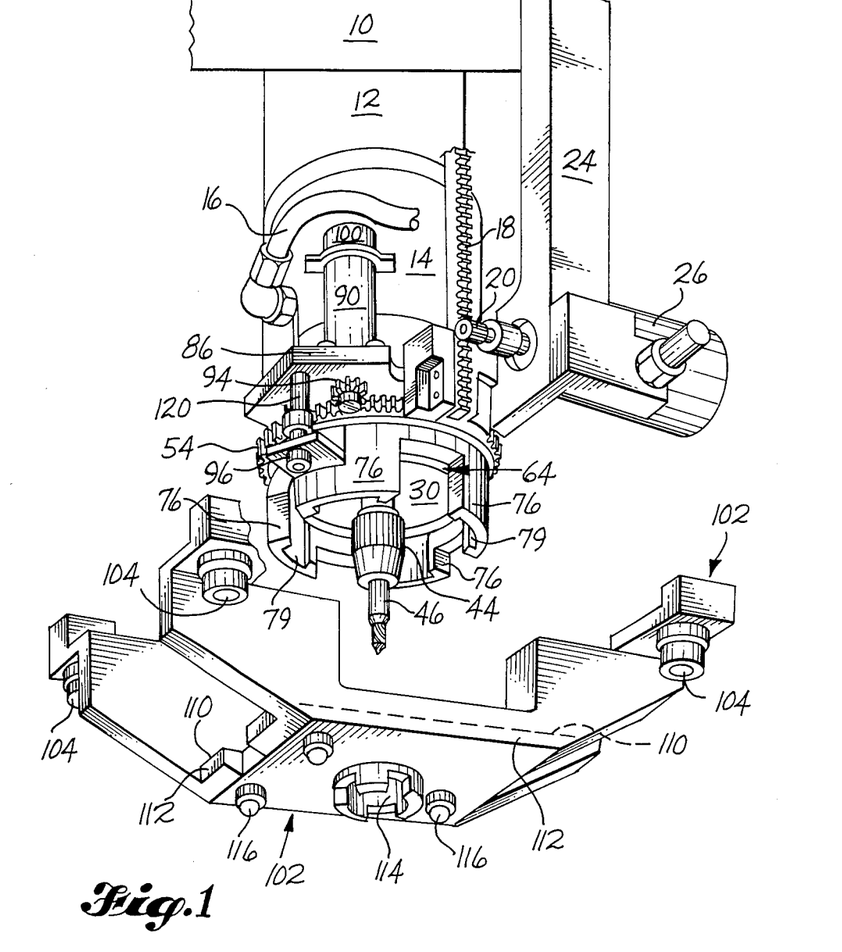
FIG. 1 is a fragmentary pictorial view of an automatic riveting machine with the automatic countersink depth control tool, according to the invention, installed thereon.

Referring again to the drawings, there is shown in FIG. 1 a portion of an automatic riveting machine, such as a Gemcor brand automatic riveter. The portion shown is supported from above by support structure 10 and extending downwardly therefrom is the outer cylinder 12 of a hydraulic ram. An inner cylinder 14 extends into the cylinder 12, the cylinder 14 being raised by hydraulic fluid through a line 16 and being lowered by a hydraulic source, not shown. Secured to the cylinder 14 is a rack 18 and engaged therewith is a pinion 20, supported by a beam member 24 which also supports an encoder 26 to which the pinion 20 is attached. The encoder 26 provides a signal to the system controller from the pinion 20 as to the position of the cylinder 14 as it is moved upwardly and downwardly.

Figure 2:
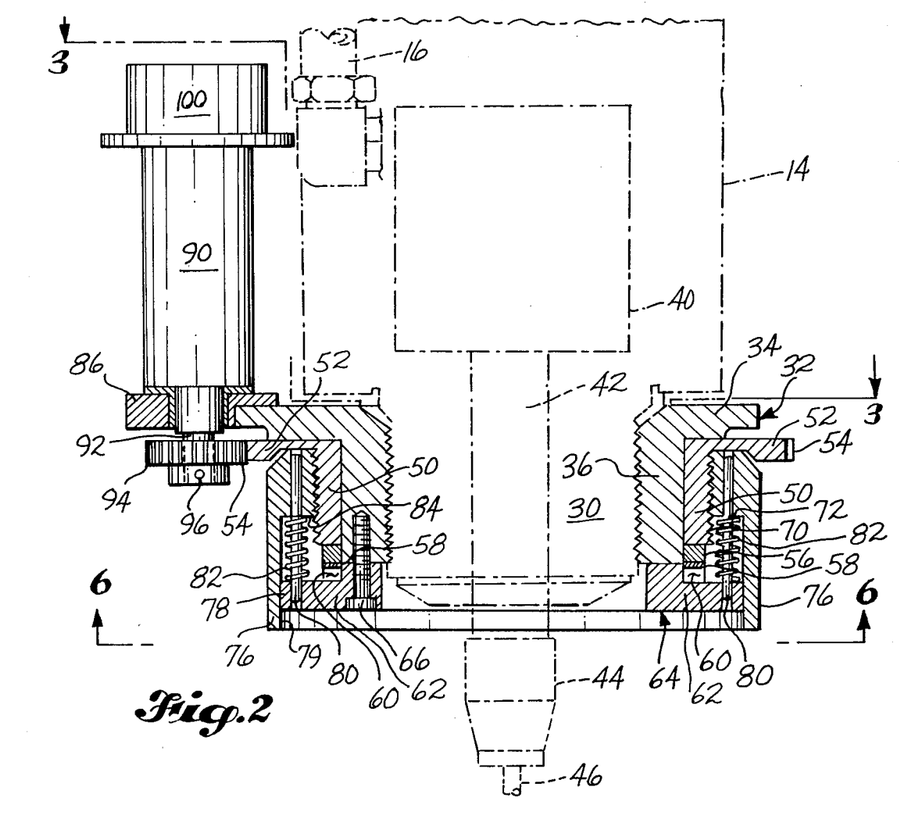
FIG. 2 is a partially cross-sectional elevational view of the tool according to the invention, taken along the line 2—2 in FIG. 3.

As best seen in FIG. 2, extending downwardly from the cylinder 14 is an externally threaded protrusion or cutting tool support 30 and threadedly engaged fixed therewith is an automatic countersink depth control tool or cutting tool base 32 having a flange 34 and a cylindrical portion 36. Supported within the cylinder 14 is a motor 40 from which extends a drill or cutting tool spindle 42. Externally of the protrusion 30 on the spindle is a drill chuck 44 and secured therein is a countersink drill or cutting tool 46.

Rotatably engaged on the external surface of the cylindrical portion 36 is a cylindrical member 50 having an annular flange 52 at its upper end, the flange having a tool external ring gear 54 on its external circumference. The lower end of the cylindrical portion is rotatable on an annular bearing 56 and under the bearing there is a ring 58 supported by an annular wave spring 60.

The spring is supported at its lower surface by an annular flange 62 of a substantially cylindrical spline 64, secured to cylindrical member 36 of the tool base by means of a plurality of bolts 66.

Figure 6:
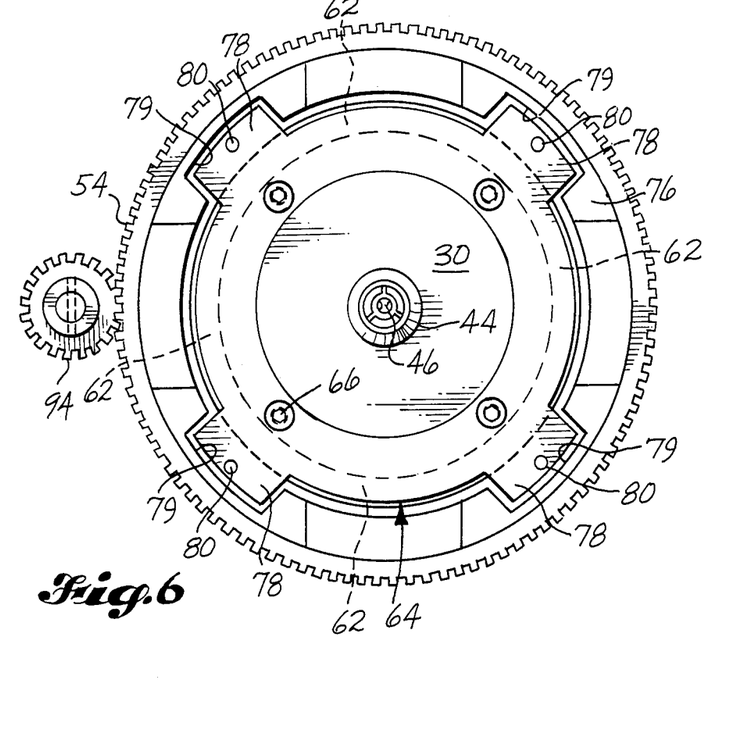
FIG. 6 is a fragmentary bottom plan view of the tool, taken along the line 6—6 in FIG. 2.

The outer cylindrical surface of the rotatable member 50 has external threads 70, threadedly engaged with internal threads 72 on an internal cylindrical surface of a nonrotatable, generally cylindrical tool stop in the form of a nut 76. As may be seen in FIG. 1, lower portions of the nut 76 are annularly spaced and are in a lowered position compared with FIG. 2. The tool thus surrounds the spindle adjacent the drill. The stop is held against rotation by spline keys 78 in sliding engagement in keyways 79 in the nut, FIGS. 1 and 6. A plurality of pins 80 extend into the keys 78 and into an upper portion of the stop externally of the threads. Surrounding the pins 80 are coil springs 82 abutting a surface 84 of the stop and an upper surface of the keys 78. Springs 82 bias the stop upwardly away from the keys and a workpiece to eliminate backlash in the threads 70 which on rotation drive the stop downwardly from the position shown in FIG. 2 and, generally downwardly and upwardly in operation.

Figure 3:
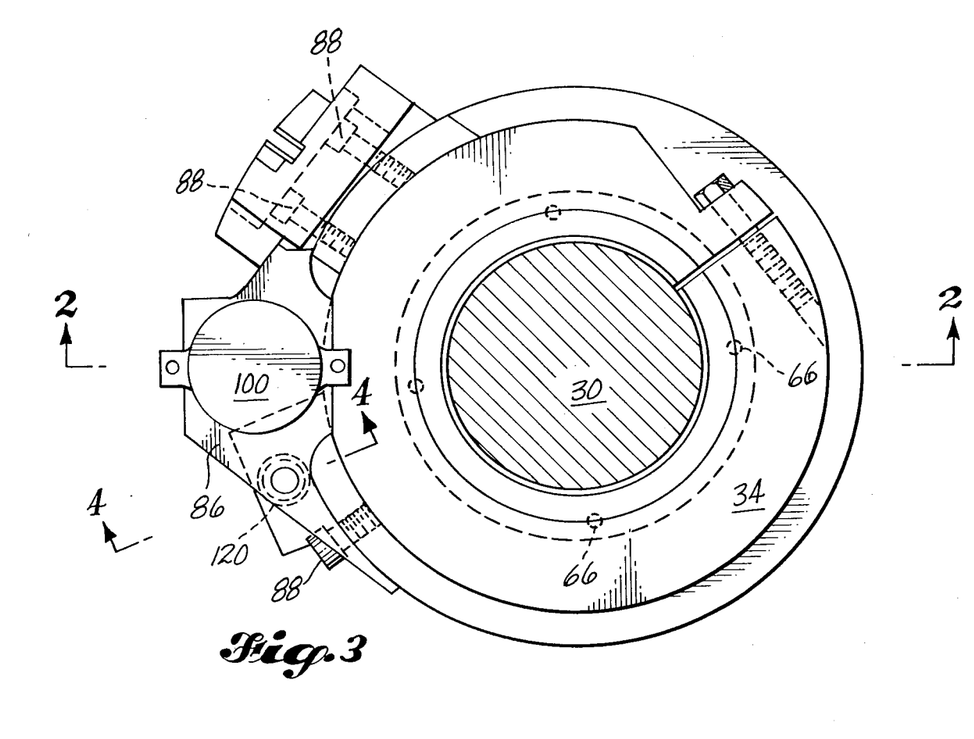
FIG. 3 is a top plan view, taken substantially along the lines 3—3 in FIG. 2.

A motor support 86 is secured to the upper surface of the base 32 by bolts 88, FIG. 3. A motor 90 has its lower end extending into the motor support and has a drive shaft 92 arranged to rotate spur gear 94, secured to the shaft by pin 96. The spur gear is engaged with the external ring gear 54 so as to cause it to rotate and in turn drive the nonrotatable stop 76 downwardly in the position shown in FIG. 2 and upwardly or downwardly from the position shown in FIG. 1. The motor rotates at 3000 rpm and has planetary reduction gears which reduce the rotation of the drive shaft to 2 rpm. One rotation of the ring gear moves the stop vertically 0.062 inch. Secured to the top of the motor is an encoder 100.

As shown in FIG. 1, a pressure foot, generally designated as 102, is similar to the Gemcor Drivmatic brand pressure foot. The pressure foot 102 is secured by structural members, not shown, through the cylindrical openings 104, to the installer structure above. The pressure foot 102 has an upper inner surface 110 on a bottom plate 112. The plate has an opening 114 through which the drill may extend to drill a countersink in a hole in a workpiece. On the lower surface of the plate 112 there are three ball sensors 116 which rest on the workpiece and indicate to the main controller of the installer that the proper contact with the workpiece is made.

Figure 4:
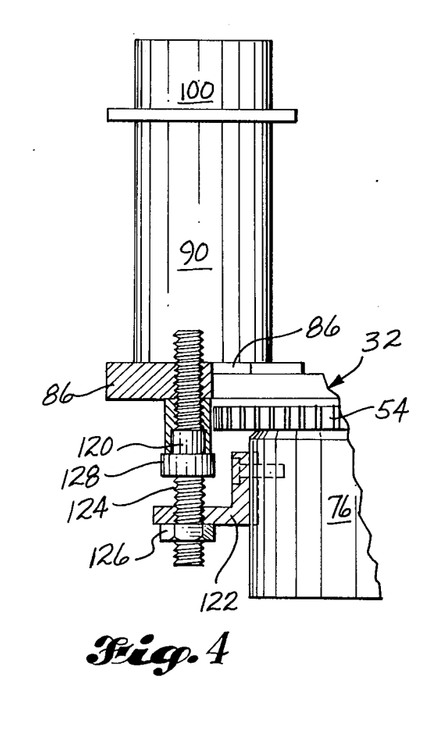
FIG. 4 is a fragmentary view illustrating a switch for limiting the return of the tool to a homing position, taken along the line 4—4 in FIG. 3.

An ultra-precision limit switch 120, FIGS. 1, 3 and 4, is secured on the support 86. The limit switch provides for establishing a homing position for the stop 76 when the installer is stopped. The homing position is shown in FIGS. 2 and 4 with the stop in the uppermost position. Secured to the stop 76 is a bracket 122 through which extends a height switch bolt 124. The bolt is positioned by a jam nut 126. When the upper end of the bolt 128 makes contact with the switch, the stop 76 will be limited in its upward movement to the position shown.

Figure 5:
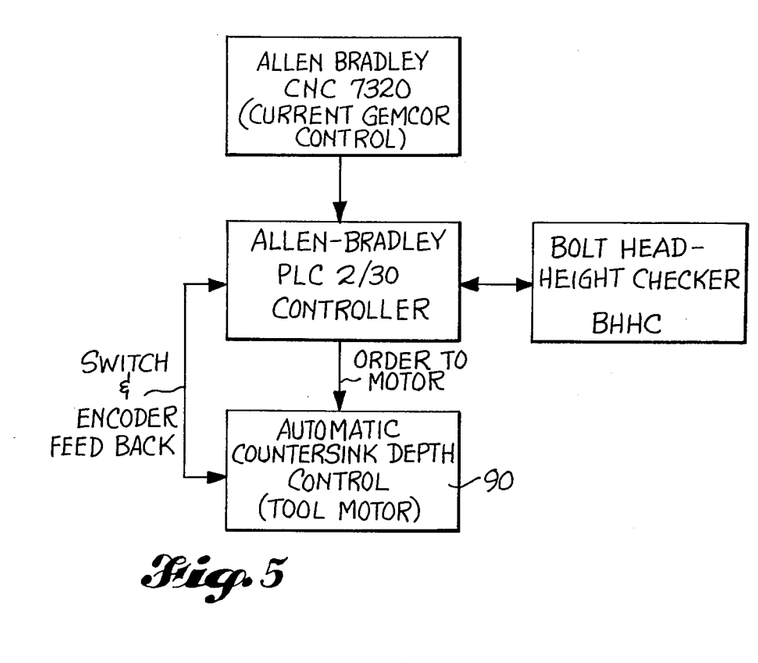
FIG. 5 is a diagrammatic view illustrating the operation of the invention with respect to information supplied to the tool to automatically limit the depth of a countersink being drilled.

In operation, the automatic fastener installer or riveter is positioned on the workpiece with the sensor balls 116 indicating the proper pressure contact. The installer is then moved horizontally to position the drill 46 to drill a countersink in a hole in the workpiece. In FIG. 5 the controller operation of the installer and the stop 76, according to the invention, is indicated. The main controller for the installer is an Allen Bradley brand CNC7320 controller which feeds signals into an Allen Bradley brand PLC2130 invention system controller. Adjustable stop 76 is under control of the motor 90 and the encoder 100. The encoder is a BEI brand incremental rotary position optical encoder which measures the amount of rotation of the motor.

To adjust the stop to the required countersink depth input is received into the PLC2130 controller from a bolt head height checker which measures each countersink head of each fastener before it is positioned for insertion into a hole and before the countersink is drilled in the hole. Thus, when the height of an individual countersink head has been measured, the PLC2130 controller translates the input into an electrical command to the motor 90 which drives the spur gear 94 which in turn drives the external ring gear 54 so that it rotates a predetermined amount. The nut is prevented from rotating by the spline 64, and the threads 70 drive the threads 72 on the nut to position the nut to the proper height with respect to the drill so that the nut and the drill have a fixed relationship.

The nut is then a hard positive stop between the upper surface 110 of the pressure foot and the drill. The feed back loop, shown in FIG. 5, sends a command to the system controller verifying that the stop is in the commanded position. The installer controller then lowers the hydraulic ram cylinder 14, the stop, and the drill so that the stop will abut the surface 110 after the drill drills the countersink to the proper depth in accordance with the adjustment of the stop 76.

While the drill is being lowered into the hole to drill the countersink, it is continuously rotating and the drilling occurs until the stop 76 is moved into contact with the surface 110. When the contact is made the drilling of the countersink will have been completed to the correct depth. The stop, in making contact with the surface 110, stops the drilling through a signal to the installer controller by means not shown. After the drilling of the countersink has been completed, the drill continues to rotate and it is moved out of the hole into the next hole and the next countersink height will be signaled to the system controller so that the step will be again adjusted to that height for the proper drilling of the next countersink. When the drilling operations are completed, the system controller causes the stop 76 to be moved upwardly to the home position and its upward movement is limited by the action of bolt 128 making contact with the limit switch 120.

The invention and its attendant advantages will be understood from the foregoing description and it will be apparent that various changes may be made in the form, construction, and arrangements of the parts of the invention without departing from the spirit and scope thereof or sacrificing its material advantages, the arrangements herein before described being merely by way of example. I do not wish to be restricted to the specific form shown or uses mentioned except as defined in the accompanying claims.

What is claimed is:

1. A depth control device for a cutting tool, comprising:

a nonrotatable generally cylindrical stop for limiting the cutting depth of a cutting tool on a workpiece, the cutting tool being associated with the stop and limited in cutting depth by action of the stop;

a rotatable generally cylindrical member threadedly engaged with said stop so that when said rotatable member is rotated, said stop is driven in the threaded engagement toward or away from the workpiece in accordance with the depth to be cut;

a motor engaged with said rotatable member and an encoder associated with the motor for receiving a command from a controller as to the depth to be cut;

said command to the motor and encoder requiring the motor to rotate said rotatable member an amount sufficient to move the stop toward or away from the workpiece corresponding to the depth to be cut;

a base supporting said stop, said rotatable member, and said motor and encoder;

said base, said stop, and said rotatable member being securable in a cutting tool device to surround a cutting tool spindle adjacent the cutting tool;

said base having a cylindrical portion fitted within and on which said rotatable member is radially supported for rotatable engagement;

said base having a flange extending over said rotatable member, and said stop; and means secured to and under said cylindrical portion of said base extending radially outwardly into said stop to prevent rotation thereof.

2. The invention according to claim 1 in which:

said rotatable member has an annular flange extending radially outwardly of an over said stop and under said base flange in rotatable engagement therewith;

said annular flange on said rotatable member having an external ring gear;

said motor having a drive shaft having a spur gear in driving engagement with said external ring gear to rotate said rotatable member.

3. The invention according to claim 2 in which:

said means to prevent the stop from rotating is a spline having keys extending into keyways in said stop; said stop being slidable on said keys toward or away from a workpiece;

pins extending into the keys and the stop;

said pins being surrounded by coil springs to constantly bias the stop away from the keys and a workpiece to prevent backlash on the stop driving threads.

4. The invention according to claim 1 including:
a feedback loop from the motor to the controller to send a command to the controller to verify that the stop is in the commanded position.

5. The invention according to claim 4 including:
switch means connected to the stop and base to limit return of the stop to a home position when the cutting tool device is shut off.

6. The invention according to claim 1 in which:
said depth control device is for use on an installer for fasteners having countersink heads and said cutting tool is a countersink drill;
the depths to be cut by the countersink drill being in accordance with the height of a countersink head of a fastener to be installed in a hole to be drilled;
said command to the motor being with respect to the height of the countersink head of each fastener;
whereby as the stop is being moved toward abutment with surface means associated with said fastener installer after the stop has been adjustably moved in accordance with the height of the countersink head to control the depth of the countersink being drilled, the countersink drilling occurs and the drilling is completed and stopped when said abutment occurs.

7. In an installer for fasteners having countersink heads,
countersink drill supporting means;
a spindle extending from said supporting means for relative rotation thereto and a countersink drill fixed to be rotated with said spindle, said drill extending toward a workpiece in which a countersink is to be drilled in a hole to receive a fastener having a countersink head;
means in said supporting means to rotate said spindle;
means to move said supporting means and said drill toward and away from said workpiece to position the supporting means and drill relative to the hole for drilling;
pressure foot surface means connected to said installer between said supporting means and said workpiece and having an opening through which the drill passes to drill a countersink, the improvement comprising:
a nonrotatable generally cylindrical stop for limiting the drilled depth of a countersink by said drill in a hole in said workpiece;
a rotatable generally cylindrical member threadedly engaged with said stop so that when said rotatable member is rotated, said stop is driven in the threaded engagement toward or away from the workpiece in accordance with the countersink depth to be drilled;
a motor engaged with said rotatable member and an encoder associated with the motor for receiving a command from a controller as to the depth of the countersink to be drilled;
said command to the motor and encoder requiring the motor to rotate said rotatable member an amount sufficient to move the stop toward or away from the workpiece corresponding to the depth of the countersink to be drilled;
a base being fixedly secured to said supporting means for drilling operation; said base supporting said stop, said rotatable member, and said motor and encoder;
said base, said stop, and said rotatable member surrounding the spindle adjacent the drill;
said base having a cylindrical portion fitted within and on which said rotatable member is radially supported for rotatable engagement;
said base having a flange extending over said rotatable member and said stop, and being in a supporting relationship with said motor; and
means secured to and under said cylindrical portion of said base extending radially outwardly into said stop to prevent rotation thereof;
said surface means being positioned to receive said stop during drilling in abutment after it has been moved in accordance with the height of the countersink head to control the depth of the countersink being drilled;
whereby as the stop is being moved toward said abutment, the countersink drilling occurs and the drilling is completed and stopped when the abutment occurs.

8. The invention according to claim 7 in which:
said rotatable member has an annular flange extending radially outwardly of and over said stop and under said base flange in rotatable engagement therewith;
said annular flange on said rotatable member having an external ring gear;
said motor having a drive shaft having a spur gear in driving engagement with said external ring gear to rotate said rotatable member.

9. The invention according to claim 8 in which:
said means to prevent the stop from rotating is a spline having keys extending into keyways in said stop; said stop being slidable on said keys toward and away from said workpiece;
pins extending into the keys and the stop;
said pins being surrounded by coil springs to constantly bias the stop away from the keys and the workpiece to prevent backlash on the stop driving threads.

10. The invention according to claim 7 including:
a feedback loop from the motor to the controller to send a command to the controller to verify that the stop is in the commanded position.

11. The invention according to claim 10 including:
switch means connected to the stop and base to limit return of the stop to a home position when the installer is shut off.

* * * * *

UNITED STATES PATENT AND TRADEMARK OFFICE
CERTIFICATE OF CORRECTION

PATENT NO. : 4,717,291

DATED : January 5, 1988

INVENTOR(S) : Avinoam Zafir

It is certified that error appears in the above-identified patent and that said Letters Patent are hereby corrected as shown below:

Column 5, line 67, "step" should be -- stop --.

Claim 2, column 6, line 53, "an" should be -- and --.

Signed and Sealed this

Twelfth Day of July, 1988

Attest:

*Attesting Officer*

DONALD J. QUIGG

*Commissioner of Patents and Trademarks*